US012728740B2

(12) United States Patent
Nakayama

(10) Patent No.: US 12,728,740 B2
(45) Date of Patent: Sep. 8, 2026

(54) CHARGING AND POWER SUPPLY DEVICE USING A CONNECTOR AND MULTIPLE PATHS FOR SUPPLYING POWER

(71) Applicant: TOYOTA JIDOSHA KABUSHIKI KAISHA, Toyota (JP)

(72) Inventor: Wataru Nakayama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 686 days.

(21) Appl. No.: 18/329,227

(22) Filed: Jun. 5, 2023

(65) Prior Publication Data

US 2024/0075828 A1 Mar. 7, 2024

(30) Foreign Application Priority Data

Sep. 6, 2022 (JP) ................................ 2022-141314

(51) Int. Cl.

| | |
|---|---|
| ***H01M 10/46*** | (2006.01) |
| ***B60L 53/16*** | (2019.01) |
| ***B60L 53/18*** | (2019.01) |
| ***B60L 55/00*** | (2019.01) |

(52) U.S. Cl.

CPC ............... *B60L 53/16* (2019.02); *B60L 53/18* (2019.02); *B60L 55/00* (2019.02)

(58) Field of Classification Search

CPC ... H02J 7/40; H02J 7/865; H02J 3/322; B60L 53/16; B60L 53/18; B60L 53/60; B60L 53/62; B60L 3/0069

USPC ......................... 320/103, 104, 109, 128, 111

See application file for complete search history.

(56) References Cited

U.S. PATENT DOCUMENTS

| | | | | |
|---|---|---|---|---|
| 6,104,160 | A | 8/2000 | Iwata et al. | |
| 2010/0007306 | A1 | 1/2010 | Fukui et al. | |
| 2019/0067973 | A1 * | 2/2019 | Yamada | B60L 53/16 |

(Continued)

FOREIGN PATENT DOCUMENTS

| | | | |
|---|---|---|---|
| JP | H11-178234 | A | 7/1999 |
| JP | 4719776 | B2 | 7/2011 |
| JP | 5575008 | B2 | 8/2014 |

(Continued)

OTHER PUBLICATIONS

Machine translation of JP2016214018A (Dec. 15, 2016) (Year: 2016).*

*Primary Examiner* — Edward Tso
(74) *Attorney, Agent, or Firm* — Oliff PLC

(57) ABSTRACT

A power supply device according to an embodiment of the present disclosure includes: a connector connected to a charging and power supply port of a vehicle having a power storage device; a charging path for supplying power from a power supply PS to the vehicle through the connector to charge the power storage device; a power supply path for supplying power from the power storage device to the outside of the vehicle through the connector; a signal line connected to the vehicle through the connector; a resistance circuit having one end connected to a GND potential and having a resistance value R1; a resistance circuit having one end connected to a GND potential and having a resistance value R4; and a changeover switch for switching a state of connecting the signal line and one of the other end of the resistance circuit and the other end of the resistance circuit.

5 Claims, 2 Drawing Sheets

(56) References Cited

U.S. PATENT DOCUMENTS

2020/0290478 A1 * 9/2020 Nakagawa .............. B60L 58/10

FOREIGN PATENT DOCUMENTS

| | | | | |
|---|---|---|---|---|
| JP | 2016214018 | A | * | 12/2016 |
| JP | 2017-079541 | A | | 4/2017 |
| JP | 6440874 | B2 | | 12/2018 |
| JP | 2020-068618 | A | | 4/2020 |

* cited by examiner 1
200
300
100
210
PS
212
BREAKER
220
222
EARTH LEAKAGE BREAKER
214
EARTH LEAKAGE BREAKER
250
AUTONOMOUS DRIVING SWITCHING DEVICE
230
240
260
270
265
275
265
275
LOAD
BRANCH BREAKER
LOAD
BRANCH BREAKER
LOAD
BRANCH BREAKER
330
320
324
322
310
EARTH LEAKAGE DETECTION DEVICE
Hot
Cold
334
INSULATION FAILURE WARNING DEVICE
332
EARTH LEAKAGE BREAKER
338
336
341B
342B
GND
342C
342E
342D
342A
341C
341A
340
342
343
341
350
CONTROLLER
PISW
CPLT
370
360
302
304
306
170
306B
306A
160
120
110
OBC
130
ECU
131
150
140

CHARGING AND POWER SUPPLY DEVICE USING A CONNECTOR AND MULTIPLE PATHS FOR SUPPLYING POWER

CROSS-REFERENCE TO RELATED APPLICATION

This application claims priority to Japanese Patent Application No. 2022-141314 filed on Sep. 6, 2022, incorporated herein by reference in its entirety.

BACKGROUND

1. Technical Field

The present disclosure relates to a charging and power supply device.

2. Description of Related Art

For example, a charging and power supply device that is connected to a power interface of an electrified vehicle through a connector, and is capable of performing a charging operation of charging a power storage device of the electrified vehicle with power from an external power source and a power supplying operation of supplying power of the power storage device to an outside of the electrified vehicle is known (see Japanese Unexamined Patent Application Publication No. 11-178234 (JP 11-178234 A)).

SUMMARY

However, it is necessary for a vehicle side to grasp which of the charging operation and the power supply operation is performed by the charging and power supply device, and to be operated together with the selected operation. Therefore, for example, when communication is performed between the charging and power supply device and the vehicle side, there is a possibility that the number of components increases and the configuration becomes complicated, such as a need for a microcomputer for communication.

In view of the above issue, an object of the present disclosure is to provide a technique capable of more simply notifying the vehicle side of an operation to be performed among the charging operation and the power supply operation as for the charging and power supply device.

In order to achieve the above object, in an embodiment of the present disclosure, a charging and power supply device is provided. The charging and power supply device includes:

- a connector connected to a power interface of an electrified vehicle including a power storage device;
- a first path for supplying power from a predetermined power source to the electrified vehicle through the connector and charging the power storage device;
- a second path for supplying power from the power storage device to an outside of the electrified vehicle through the connector;
- a signal line connected to the electrified vehicle through the connector;
- a first resistance unit that has one end connected to a constant voltage portion and that has a first resistance value;
- a second resistance unit that has one end connected to the constant voltage portion and that has a second resistance value different from the first resistance value; and
- a switching unit that switches a state in which the signal line is connected to one of the other end of the first resistance unit and the other end of the second resistance unit.

According to the above-described embodiment, it is possible to more simply notify the vehicle side of an operation to be performed among the charging operation and the power supply operation as for the charging and power supply device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a perspective view of an exemplary connector; and.

DETAILED DESCRIPTION OF EMBODIMENTS

Embodiments of the present disclosure will be described below with reference to the drawings.

Configuration of the Charging and Power Supply System

Figure 1:
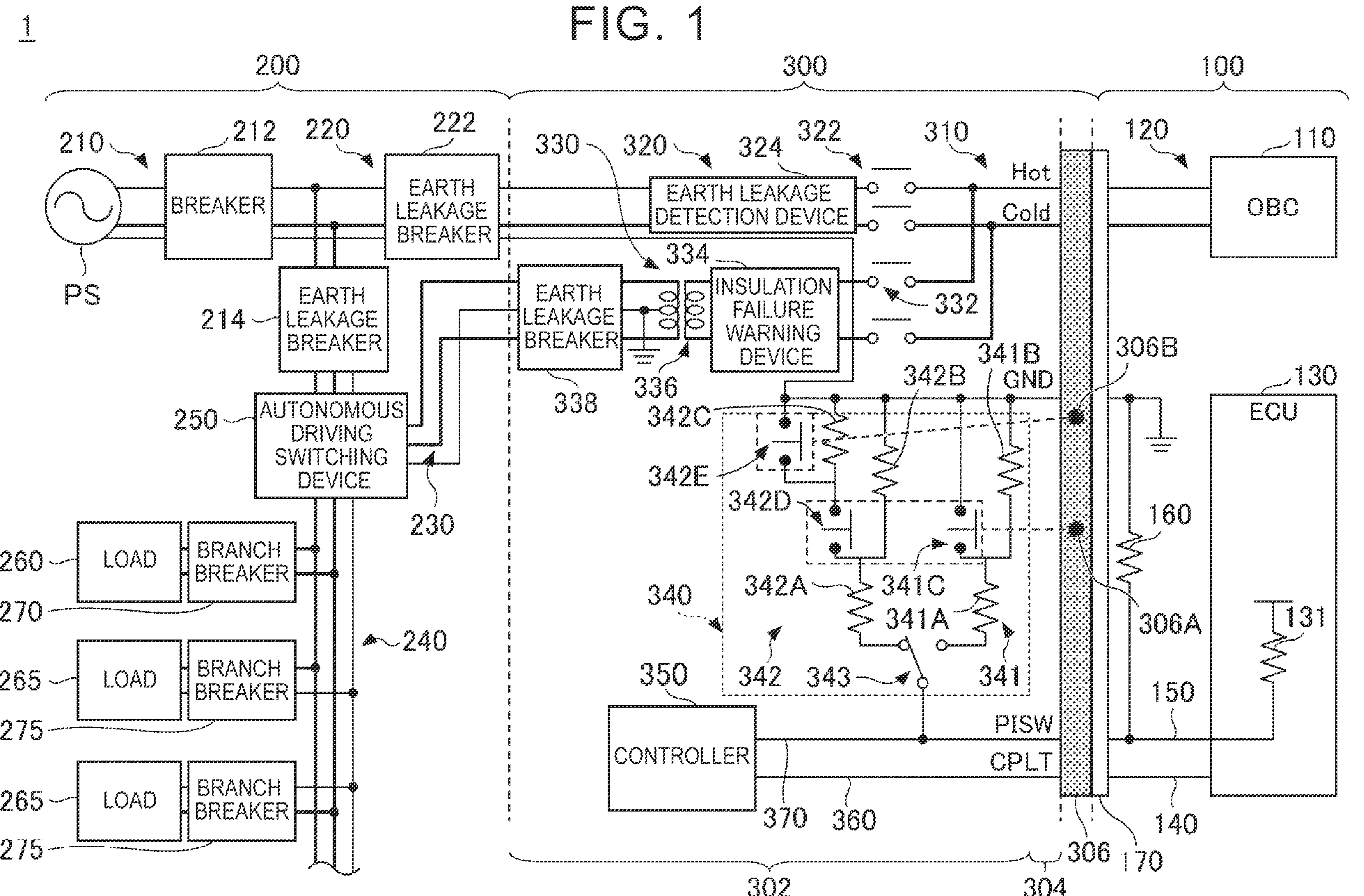
FIG. 1 is a diagram illustrating an example of a configuration of a charging and power supply system.
Figure 2:
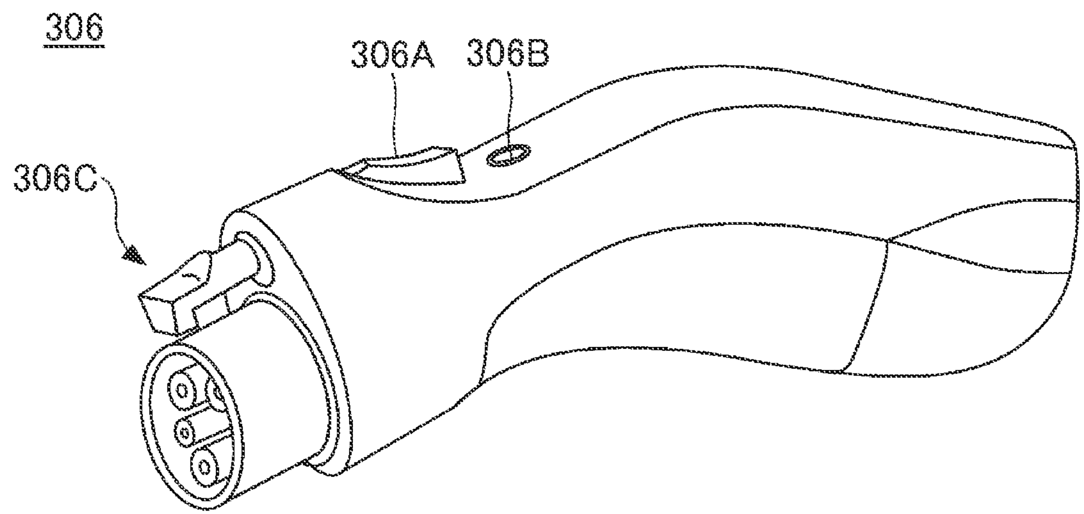

Referring to FIGS. 1 and 2, the configuration of the charging and power supply system 1 according to the present embodiment will be described.

FIG. 1 is a diagram illustrating an example of a configuration of a charging and power supply system 1. FIG. 2 is a diagram illustrating an example of the connector 306. Specifically, FIG. 2 is a diagram illustrating a specific example of an existing power supply connector that can be adopted as the connector 306.

As illustrated in FIG. 1, the charging and power supply system 1 includes a vehicle 100, a house 200, and a charging and power supply device 300.

The charging and power supply system 1 charges the power storage device of the vehicle 100 by electric power supplied from the power supply PS (an exemplary power supply at a place) of the house 200 through the charging and power supply device 300, and supplies electric power to the house 200 by electric power supplied from the power storage device of the vehicle 100.

Vehicle

An exemplary vehicle 100 (electrified vehicle) is an electrified vehicle equipped with a power storage device and capable of traveling by driving an electric motor with electric power of the power storage device.

The vehicle 100 includes an on-board charger (OBC) 110, a power path 120, an Electronic Control Unit (ECU) 130, a signaling line 140,150, a resistor 160, and a charging and power supply port 170.

The on-board charger 110 charges the power storage device by using the AC power supplied from the charging and power supply device 300 through the power path 120 under the control of ECU 130. Specifically, the on-board charger 110 converts a single-phase alternating current input from the power path 120 into a direct current to charge the power storage device.

In addition, the on-board charger 110 supplies the power of the power storage device to the charging and power supply device 300 through the power path 120 under the control of ECU 130. Specifically, the on-board charger 110 converts the DC of the power storage device into AC power and outputs the AC power to the power path 120.

The power path 120 is composed of two power lines. One end of the power path 120 is connected to the on-board charger 110, and the other end is connected to the charging and power supply port 170.

The power path 120 supplies the on-board charger 110 with the AC power supplied from the charging and power supply device 300 through the charging and power supply port 170. In addition, the power path 120 supplies the AC power output from the on-board charger 110 to the charging and power supply device 300 through the charging and power supply port 170.

ECU 130 controls the on-board charger 110 to control charging of the power storage device of the vehicle 100 and power supply from the power storage device to the outside.

ECU 130 is connected to the signal line 140,150.

ECU 130 includes a resistor 131.

The resistor 131 is a pull-up resistor of the signal line 150. One end of the resistor 131 is connected to the inside power supply of ECU 130, and the other end thereof is connected to the signal line 150.

One end of the signal line 140 is connected to ECU 130, and the other end thereof is connected to the charge and power supply port 170.

One end of the signal line 150 is connected to ECU 130, and is connected to the resistor 131 through a signal line inside ECU 130. The other end of the signal line 150 is connected to the charging and power supply port 170.

The resistor 160 is a pull-down resistor of the signal line 150. One end of the resistor 160 is connected to the signal line 150, and the other end thereof is connected to the ground of the vehicle 100.

The charging and power supply port 170 is a power interface of the vehicle 100. A connector 306 of the charging and power supply device 300 is connected to the charging and power supply port 170.

Housing

The house 200 includes a power path 210,220,230,240 and an autonomous driving switching device 250.

The power path 210 includes two voltage lines and one neutral line, and supplies single-phase AC power from the power supply PS by a single-phase three-wire system. One end of the power path 210 is connected to the power supply PS, and the other end thereof is connected to the autonomous driving switching device 250.

The power path 210 is provided with a breaker 212 and an earth leakage breaker 214.

The power path 220 branches from the power path 210. The power path 220 includes two voltage lines and one neutral line, and supplies power to the charging and power supply device 300 by a single-phase three-wire system. The power path 220 has one end connected to a portion of the power path 210 between the breaker 212 and the earth leakage breaker 214, and the other end connected to the charging path 320 of the charging and power supply device 300.

The power path 220 is provided with a high-speed high-sensitivity type earth leakage breaker 222.

The power path 230 includes two voltage lines and one neutral line, and receives power from the charging and power supply device 300 by a single-phase three-wire system. One end of the power path 230 is connected to the power supply path 330 of the charging and power supply device 300, and the other end thereof is connected to the autonomous driving switching device 250.

The power path 240 is composed of two voltage lines and one neutral line, and supplies power to the load 260,265 connected in parallel by a single-phase three-wire system.

The power path 240 and each of the load 260 and the load 265 are connected via a breaker 270,275.

The autonomous driving switching device 250 switches between a normal operation in which the load 260,265 of the house 200 is operated by electric power PS the power supply and an autonomous operation in which the loads 260 and 265 of the house 200 are operated by power supply from the vehicle 100 (the charging and power supply device 300). Specifically, the autonomous driving switching device 250 switches between a state in which the power path 210 and the power path 240 are connected and a state in which the power path 230 and the power path 240 are connected.

Charging and Power Supply Device

The charging and power supply device 300 includes a housing 302, a cable 304 extending from the housing 302, and a connector 306 connected to a distal end of the cable 304. The charging and power supply device 300 includes a power path 310, a charging path 320, a power supply path 330, a resistance circuit 340, a controller 350, and a signal line 360,370.

The connector 306 is connected to the charging and power supply port 170 by being inserted into the charging and power supply port 170 of the vehicle 100, for example. As shown in FIG. 2, the connector 306 has a known latching mechanism 306C that, when plugged into the charging and power supply port 170, acts between the latching mechanism 306C and the engagement portion of the charging and power supply port 170 to prevent removal from the charging and power supply port 170.

As shown in FIGS. 1 and 2, the connector 306 includes a latch release button 306A and a power supply initiation button 306B. Thus, an existing power supply connector (see FIG. 2) can be adopted as the connector 306 of the present example.

The latch release button 306A (an example of a first operating unit) is an operation unit used by a user to release a latch mechanism 306C (an example of a latch) of the connector 306 connected to the charge and power supply port 170.

The power supply start-button 306B (an exemplary second operating unit) is an operation unit used by the user to start power supply from the vehicle 100 to the house 200.

The power path 310 (an example of the third path) includes two single-phase AC power lines. One end of the power path 310 is connected to the connector 306, and is connected to the power path 120 through the connector 306 and the charging and power supply port 170. The other end of the power path 310 branches into a charging path 320 and a power supply path 330. That is, the charging path 320 and the power supply path 330 merge into the power path 310 toward the vehicle 100.

The charging path 320 (an example of the first path) is used to charge the power storage device of the vehicle 100. The charging path 320 includes two single-phase AC power lines, and supplies electric power supplied from the house 200 (power supply PS) to the vehicles 100. The charging path 320 has one end connected to the power path 220 of the house 200 and the other end connected to the power path 310.

In the charging path 320 (an example of the second path), the relay 322 and the electric leakage detection device 324 are provided in order from the power path 310 side.

The power supply path 330 is used to supply power from the power storage device of the vehicle 100 to the house 200.

The power supply path 330 includes two single-phase AC power lines or three power lines (two voltage lines and a neutral line), and supplies power supplied from the vehicle 100 to the house 200. The power supply path 330 has one end connected to the power path 310 and the other end connected to the power path 230 of the house 200.

In the power supply path 330, a relay 332, a leakage alarm device 334, a transformer 336, and an earth leakage breaker 338 are provided in this order from the power path 310 side.

The resistance circuit 340 is a pull-down resistor of the signal line 370. One end of the resistance circuit 340 is connected to the signal line 370, and the other end thereof is connected to a GND potential (a constant-voltage unit) of 0V (volt).

The controller 350 performs control related to the charging and power supply device 300.

For example, when an operation of selecting charging of the power storage device of the vehicle 100 is received and the connector 306 is connected to the charging and power supply port 170 of the vehicle 100, the controller 350 shifts the relay 322 from the off state to the on state.

Further, for example, when an operation of selecting power supply from the power storage device of the vehicle 100 to the house 200 is received and the connector 306 is connected to the charging and power supply port 170 of the vehicle 100, the controller 350 shifts the relay 332 from the off state to the on state.

The signal lines 360 are used to transmit control signals (CPLT signals) of the controllers 350 to ECU 130 of the vehicles 100. One end of the signal line 360 is connected to the controller 350. The other end of the signal line 360 is connected to the connector 306, and is connected to the signal line 140 of the vehicle 100 via the connector 306 and the charging and power supply port 170.

The signal line 370 is used to transmit a voltage signal (PISW signal) corresponding to the resistance of the resistance circuit 340 to ECU 130 of the controllers 350 and the vehicles 100. One end of the signal line 370 is connected to the controller 350. The other end of the signal line 370 is connected to the connector 306, and is connected to the signal line 140 of the vehicle 100 via the connector 306 and the charging and power supply port 170.

For example, as illustrated in FIG. 1, the charging path 320, the power supply path 330, the resistance circuit 340, and the controller 350 are mounted in the housing 302, and the cable 304 includes a power path 310, a signal line 360,370, and a signal line having a GND potential. Thus, the configuration of the present example can be realized by using an existing connector and cable for charging or power supply.

Details of the Resistance Circuit

Next, the resistance circuit 340 will be described in detail with reference to FIGS. 1 and 2.

The resistance circuit 340 includes a resistance circuit 341,342 and a changeover switch 343.

The resistance circuit 341 (an example of the first resistance unit) is used when the power storage device of the vehicle 100 is charged using the charging path 320. The resistance circuit 341 has one end connected to GND potential and the other end connected to one of the fixed contacts of the changeover switch 343.

The resistance circuit 342 (an example of the second resistance unit) is used when power is supplied from the vehicle 100 to the house by using the power supply path 330. The resistance circuit 342 has one end connected to GND potential and the other end connected to the other fixed contact of the changeover switch 343.

The changeover switch 343 (an example of a switching unit) switches between a state in which the signal line 370 and the resistance circuit 341 are connected and a state in which the signal line 370 and the resistance circuit 342 are connected. The changeover switch 343 switches between a state in which the movable portion is connected to the signal line 370 and the movable contact interlocked with the movable portion is connected to one fixed contact corresponding to the resistance circuit 341 and a state in which the movable contact is connected to the other fixed contact corresponding to the resistance circuit 342.

The changeover switch 343 connects the signal line 370 and the resistance circuit 341 when the charging and power supply device 300 charges the power storage device of the vehicle 100. On the other hand, the changeover switch 343 sets the signal line 370 and the resistance circuit 342 to be connected to each other when the charging and power supply device 300 supplies power from the power storage device of the vehicle 100 to the house 200. For example, the changeover switch 343 switches between the two states according to the contents of the operation of selecting charging or power supply from the user to the charging and power supply device 300. At this time, two states may be switched by directly inputting an operation signal corresponding to an operation received from the user to the changeover switch 343, or two states may be switched in response to a control signal from the controller 350 that takes in the operation signal.

The resistance circuit 341 includes a resistor 341A,341B and a relaying 341C.

The resistor 341A,341B is connected in series between the fixed contact of the changeover switch 343 and GND potential.

The relaying 341C is provided in a path for short-circuiting between the midpoint between the resistive 341A, 341B and GND potential.

For example, the relay 341C is normally closed, and the relay 341C transitions to the off-state in conjunction with the operation when the latch release button 306A of the connector 306 is operated. Further, the relay 341C returns to the ON state when the state in which the latch release button 306A is operated (pressed) is released.

The resistance circuit 342 includes resistors 342A to 342C and a relaying 342D,342E.

One end of the resistor 342A is connected to the fixed contact of the changeover switch 343, and the other end thereof is connected to each of the resistor 342B and the relay 342D.

The resistor 342B, the relay 342D, and the resistor 342C are connected in parallel between the resistor 342A and GND potential.

For example, like the relay 341C, the relay 342D is of a normally closed type, and when the latch release button 306A of the connector 306 is operated (pressed), the relay shifts to the off-state in conjunction with the operation. Further, the relay 342D returns to the ON state when the state in which the latch release button 306A is operated (pressed) is released.

The relay 342E is provided in a path for short-circuiting between the intermediate point between the relay 342D and the resistor 342C and GND potential.

For example, the relay 342E is a normally open type, and when the power supply starting button 306B of the connector 306 is operated, the relay transitions to the on-state in conjunction with the operation.

As described above, the resistance circuit 340 can vary the resistance according to the operation of the relay 341C, the relay 342D,342E, and the changeover switch 343.

Operation of the Charging and Power Supply System

Next, the operation of the charging and power supply system 1 will be described with reference to FIGS. 1 and 2.

When Connecting the Connector to the Charging and Power Supply Port

When the connector 306 is not connected to the charging and power supply port 170 of the vehicle 100, the voltage of the power supply inside ECU 130 is divided by the resistor 131 and the resistor 160 on the signal line 150. Hereinafter, the voltage of the signal line 150 is referred to as "voltage level V0".

When the connector 306 is connected to the charging and power supply port 170 of the vehicle 100, the signal line 370 of the charging and power supply device 300 and the signal line 150 of the vehicle 100 are connected, and GND potential of the charging and power supply device 300 and the ground of the vehicle 100 are connected. Therefore, the signal line 150 is a voltage obtained by dividing the voltage of the power supply inside ECU 130 by the resistor 131, the resistor 160, and the parallel connector of the resistance circuit 340. At this time, since the resistance value of the combined resistance of the resistor 160 and the resistance circuit 340 is smaller than the resistance value of the single element of the resistor 160, the voltage of the signal line 150 changes in a direction smaller than that in the case where the connector 306 is not connected to the charging and power supply port 170.

Therefore, by appropriately setting the voltage level V0, ECU 130 can detect that the connector 306 is connected by changing the voltage of the signal line 150 to be smaller than the voltage level V0.

Charging of the Power Storage Device of the Vehicle

When the connector 306 is connected to the charging and power supply port 170 of the vehicle 100 and the charging and power supply device 300 charges the power storage device of the vehicle 100, the changeover switch 343 is in a state of connecting the signal line 370 and the resistance circuit 341. Therefore, the resistance value of the resistance circuit 340 is equal to the resistance value of the resistance circuit 341.

Since the relay 341C is normally open and in the on-state, the resistance value R1 (an exemplary first resistance value) of the resistance circuit 341 is equal to the resistance value of the resistor 341A. Hereinafter, the range in which the voltage of the signal line 150,370 may be included is referred to as a "voltage level V1" (V1<V0).

Therefore, by appropriately setting the voltage level V1, ECU 130 can recognize that the charging and power supply device 300 charges the power storage device of the vehicle 100 when the voltage of the signal line 150 is in the voltage level V1. Therefore, ECU 130 can control the on-board charger 110 to charge the power storage device with the electric power supplied from the charging and power supply device 300. In addition, when the charging and power supply device 300 charges the power storage device of the vehicle 100, the controller 350 can detect an anomaly of the resistance circuit 340 by determining whether the voltage of the signal line 370 is in the voltage level V1.

When the user operates the latch release button 306A, the relay 341C is switched to the off-state, and the resistance value R2 of the resistance circuit 341 shifts to the resistance value of the combined resistance of the series-connected member of the resistor 341A,341B. Therefore, the resistance value R2 of the resistance circuit 341 is larger than that in the case where the relay 341C is in the ON state, and consequently, the voltage of the signal line 150,370 is larger than that in the case where the relay 341C is in the ON state. The resistance value R2 differs from the resistance value R1 described above. Hereinafter, the voltage of the signal line 150,370 is referred to as "voltage level V2" (V0>V2>V1).

Therefore, by appropriately setting the voltage level V2, ECU 130 can detect that the latching of the connector 306 has been released by increasing the voltage of the signal line 150 from the voltage level V1 to the voltage level V2. Therefore, for example, ECU 130 can forcibly stop the charging operation when detecting that the latching of the connector 306 has been released while the charging operation of the power storage device is being performed by the on-board charger 110. In addition, when the latch release button 306A of the connector 306 is operated, the controller 350 can detect an anomaly of the resistance circuit 340 by determining whether the voltage of the signal line 370 rises from the voltage level V1 to the voltage level V2.

When Power is Supplied from a Vehicle Power Storage Device to a House

When the connector 306 is connected to the charging and power supply port 170 of the vehicle 100 and the charging and power supply device 300 supplies power from the power storage device of the vehicle 100 to the house, the changeover switch 343 is in a state of connecting the signal line 370 and the resistance circuit 342. Therefore, the resistance value of the resistance circuit 340 is equal to the resistance value of the resistance circuit 342.

Since the relay 341C is normally open and in the on-state, when the power supply starting button 306B of the connector 306 is not operated, the resistance value R3 of the resistance circuit 342 is equal to the resistance value of the combined resistance of the resistors 342A to 342C. The resistance value R3 differs from the resistance value R1,R2 described above. Hereinafter, the voltage of the signal line 150,370 is referred to as "voltage level V3" (V0>V3).

Therefore, when the voltage level V3 is appropriately set, ECU 130 can recognize that the charging and power supply device 300 is ready to supply power from the power storage device of the vehicle 100 to the house 200 when the voltage of the signal line 150 is in the voltage level V3. Therefore, ECU 130 can control the on-board charger 110 to prepare for power supply from the power storage device of the vehicle 100 to the house 200. In addition, the controller 350 can detect an anomaly of the resistance circuit 340 by determining whether or not the voltage of the signal line 370 is in the voltage level V3 when the charging and power supply device 300 is in a preparatory stage for supplying power from the power storage device of the vehicle 100 to the house 200.

In this condition, when the power supply start button 306B of the connector 306 is operated, the resistance value R4 (an exemplary second resistance value) of the resistance circuit 342 is equal to the resistance value of the resistor 342A, and changes to a smaller value than when the power supply start button 306B of the connector 306 is operated. As a result, the voltage of the signal line 150,370 changes to a smaller value than when the power supply start-button 306B of the connector 306 is operated. The resistance value R4 is a value that differs from the above-described resistance value R1 from R3. Hereinafter, the voltage of the signal line 150,370 is referred to as "voltage level V4" (V0>V3>V4).

Therefore, when the voltage level V4 is appropriately set, ECU 130 can recognize that the charging and power supply device 300 supplies power from the power storage device of the vehicle 100 to the house 200 by shifting the voltage of the signal line 150 from the voltage level V3 to the voltage level V4. Therefore, ECU 130 can control the on-board charger 110 and start power supply from the power storage device of the vehicle 100 to the house 200. In addition, when the charging and power supply device 300 supplies power from the power storage device of the vehicle 100 to the house 200, the controller 350 can detect an anomaly of the resistance circuit 340 by determining whether or not the voltage of the signal line 370 is in the voltage level V4.

When the user operates the latch release button 306A, the relay 342D is switched to the off-state, and the resistance value R5 of the resistance circuit 342 shifts to the resistance value of the combined resistance of the series-connected member of the resistor 342A,342B. Therefore, the resistance value R5 of the resistance circuit 342 is larger than that in the case where the relay 342D is in the ON state, and consequently, the voltage of the signal line 150,370 is larger than that in the case where the relay 342D is in the ON state. The resistance value R5 is a value that differs from the above-described resistance value R1 from R4. Hereinafter, the voltage of the signal line 150,370 is referred to as "voltage level V5" (V0>V5>V3>V4).

Therefore, when the voltage level V5 is appropriately set, ECU 130 can detect that the latching of the connector 306 has been released by increasing the voltage of the signal line 150 from the voltage level V4 or the voltage level V3 to the voltage level V5. Therefore, for example, ECU 130 can forcibly stop the power supply operation when it detects that the latching of the connector 306 has been released while the power supply operation from the power storage device to the house 200 by the on-board charger 110 is being performed. In addition, when the latch release button 306A of the connector 306 is operated, the controller 350 can detect an anomaly of the resistance circuit 340 by determining whether the voltage of the signal line 370 rises from the voltage level V3 or the voltage level V4 to the voltage level V5.

Resistance values of the resistors 131,160,341A,341B, 342A to 342C are appropriately set so that R5 differ from the resistance values R1 of the resistance circuits 340 corresponding to the voltage levels V1 to V5, respectively. Further, the resistance values of the resistors 131,160,341A, 341B,342A to 342C are appropriately set so that V5 do not overlap each other from the voltage-level V1. Accordingly, ECU 130 can appropriately perform the above-described determination by comparing the voltage of the signal line 150 with each of V5 from the voltage level V0. In addition, the controller 350 compares the signal line 370 with each of V5 from the voltage-level V0 to appropriately determine the presence or absence of an anomaly in the resistance circuit 340.

As described above, the charging and power supply device 300 includes the changeover switch 343 that switches a state in which one of the resistance circuits 341,342 connected to GND potential and having resistance values R1,R4 that differ from each other and the signal line 370 are connected.

Thus, the charging and power supply device 300 can change the voltage of the signal line 370 between the case where the resistance circuit 341 and the signal line 370 are connected and the case where the resistance circuit 342 and the signal line 370 are connected. Consequently, the charging and power supply device 300 can notify ECU 130 of whether to charge the power storage device of the vehicle 100 or to supply power from the power storage device of the vehicle 100 to the house 200 by using the voltage of the signal line 150 connected to the signal line 370. Therefore, for example, the charging and power supply device 300 does not need to notify ECU 130 of whether to charge the power storage device of the vehicle 100 or to supply power from the power storage device of the vehicle 100 to the house 200 by communication using a predetermined frame. Further, for example, the charging and power supply device 300 prepares the connector for charging and power supply, and does not need to notify ECU 130 of which of charging the power storage device of the vehicle 100 and power supply from the power storage device of the vehicle 100 to the house 200 is performed with the type of the connector to be connected. Therefore, the charging and power supply device 300 can more simply notify the vehicle side of the operation to be performed among the charging operation and the power supply operation, and can suppress, for example, an increase in the number of components due to the addition of a communication function, the adoption of a connector for charging and power supply, and the like.

Other Embodiments

Next, another embodiment will be described with reference to FIG. 3.

Figure 3:
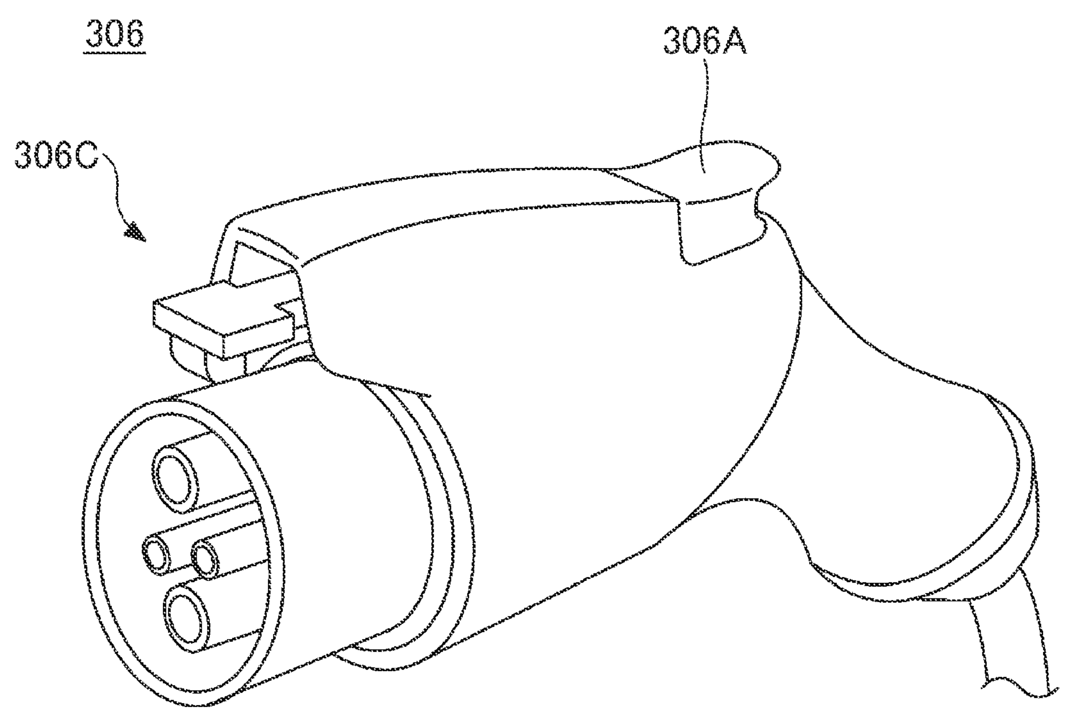
FIG. 3 is a perspective view illustrating another example of the connector.

FIG. 3 is a perspective view illustrating another example of the connector 306. Specifically, FIG. 3 is a diagram illustrating a specific example of a charging connector that can be employed as the connector 306.

Modifications and changes may be made to the above-described embodiments as appropriate.

For example, as shown in FIG. 3, in the above-described embodiment, the power supply start-button 306B may be omitted. Thus, the existing charging connector can be used as the connector 306. Here, the resistor 342C and the relay 342E are omitted.

Although the embodiment has been described in detail above, the present disclosure is not limited to such specific embodiment, and various modifications and improvements can be made within the scope of the gist described in the claims.

What is claimed is:

1. A charging and power supply device comprising:

a connector connected to a power interface of an electrified vehicle including a power storage device;

a first path for supplying power from a predetermined power source to the electrified vehicle through the connector and charging the power storage device;

a second path for supplying power from the power storage device to an outside of the electrified vehicle through the connector;

a signal line connected to the electrified vehicle through the connector;

a first resistance unit that has one end connected to a ground potential and that has a first resistance value;

a second resistance unit that has one end connected to the ground potential and that has a second resistance value different from the first resistance value;

a switching unit that switches a state in which the signal line is connected to one of the other end of the first resistance unit and the other end of the second resistance unit;

a housing;

a cable that is provided so as to extend from the housing and that has a tip to which the connector is attached; and a third path that is provided on the cable and provided such that the first path and the second path are merged into one path, wherein the first path, the second path, the first resistance unit, the second resistance unit, and the switching unit are provided inside the housing.

2. The charging and power supply device according to claim 1, wherein the connector includes a latch for suppressing the connector from detaching from the power interface, and a first operating unit for releasing the latch.

3. The charging and power supply device according to claim 1, wherein:

the connector includes a second operating unit for starting power supply from the power storage device to an outside of the electrified vehicle through the second path; and the second resistance unit changes a resistance value to the second resistance value in conjunction with an operation of starting power supply to the second operating unit.

4. The charging and power supply device according to claim 2, wherein:

when the signal line and the other end of the first resistance unit are connected by the switching unit, the first resistance unit changes a resistance value from the first resistance value to another value different from the first resistance value in conjunction with an operation of releasing the latch to the first operating unit; and when the signal line and the other end of the second resistance unit are connected by the switching unit, the second resistance unit changes a resistance value from the second resistance value to another value different from the second resistance value in conjunction with an operation of releasing the latch to the first operating unit.

5. The charging and power supply device according to claim 1 further comprising a controller connected to the signal line, wherein the controller is configured to selectively connect one of the first resistance unit and the second resistance unit to the same signal line to generate a control signal on the same signal line, and to determine, based on the generated control signal, whether to supply the power via the first path or the second path.

* * * * *